US 7,970,840 B2

(12) United States Patent
Cannon et al.

(10) Patent No.: US 7,970,840 B2
(45) Date of Patent: Jun. 28, 2011

(54) METHOD TO CONTINUE INSTANT MESSAGING EXCHANGE WHEN EXITING A VIRTUAL WORLD

(75) Inventors: Ulysses Lamont Cannon, Durham, NC (US); Angela Richards Jones, Durham, NC (US); Ruthie D. Lyle-Cannon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/166,637

(22) Filed: Jul. 2, 2008

(65) Prior Publication Data
US 2010/0005141 A1 Jan. 7, 2010

(51) Int. Cl.
G06F 15/16 (2006.01)
G06F 3/048 (2006.01)

(52) U.S. Cl. ........ 709/206; 709/204; 709/205; 709/207; 715/706; 715/757

(58) Field of Classification Search .......... 709/204–207; 715/706, 751–754, 757–759
See application file for complete search history.

(56) References Cited

U.S. PATENT DOCUMENTS

| | | | | |
|---|---|---|---|---|
| 6,784,901 | B1 * | 8/2004 | Harvey et al. | 715/757 |
| 6,907,447 | B1 * | 6/2005 | Cooperman et al. | 709/203 |
| 7,206,813 | B2 * | 4/2007 | Dunbar et al. | 709/206 |
| 7,660,815 | B1 * | 2/2010 | Scofield et al. | 707/999.102 |
| 2003/0174178 | A1 * | 9/2003 | Hodges | 345/848 |
| 2004/0078443 | A1 * | 4/2004 | Malik | 709/206 |
| 2004/0078445 | A1 * | 4/2004 | Malik | 709/206 |
| 2004/0103149 | A1 * | 5/2004 | Tanigawa et al. | 709/204 |
| 2006/0075055 | A1 * | 4/2006 | Littlefield | 709/206 |
| 2008/0214253 | A1 * | 9/2008 | Gillo et al. | 463/1 |
| 2008/0255957 | A1 * | 10/2008 | Erdem et al. | 705/26 |
| 2009/0265642 | A1 * | 10/2009 | Carter et al. | 715/757 |
| 2009/0282109 | A1 * | 11/2009 | Lyle et al. | 709/206 |

* cited by examiner

Primary Examiner — Brendan Higa
(74) Attorney, Agent, or Firm — A. Bruce Clay

(57) ABSTRACT

A method, system and computer program product for associating a virtual instant messaging client, of an avatar, with a standard instant messaging account. When a communication transcript is completed in a virtual instant messaging session, the communication transcript is stored. Wherein the stored communication transcript is an archived virtual world (VW) communication transcript. The archived VW communication transcript is associated with one or more instant messaging clients. A request is received to continue communication, with one or more avatars, when a virtual instant messaging session is completed. When the request is received a graphical user interface (GUI) is automatically displayed. One or more of the following selections are enabled: communicate via the instant messaging session or do not communicate via the instant messaging session. When the selection to communicate, with the one or more avatars, via the instant messaging session is received, the system dynamically initiates an instant messaging session. The GUI is automatically closed when a do not communicate via the instant messaging session selection is received. Access to the archived VW communication transcript is enabled during one or more instant messaging sessions. The content of the archived VW communication transcript is automatically displayed when the archived VW communication transcript is accessed during the instant messaging session.

3 Claims, 8 Drawing Sheets

METHOD TO CONTINUE INSTANT MESSAGING EXCHANGE WHEN EXITING A VIRTUAL WORLD

BACKGROUND

1. Technical Field

The present invention generally relates to computer systems and in particular to messaging applications in computer memory systems.

2. Description of the Related Art

Virtual world applications, such as Second Life, are evolving as a popular communication tool. Virtual world applications enable users to communicate in a computer generated environment, as avatars. Virtual worlds are increasingly of interest to users for entertainment (i.e., games) and educational purposes. Businesses are finding new ways to access users through the virtual environments, for product placement and to offer services. In addition, virtual worlds may be utilized to illustrate medical procedures, or for business training purposes.

Interest in creating an on-line community in which people are represented by avatars and can interact with each other in the virtual world is growing. Ideally, the virtual world provides realism so that the avatars may interact with each other and their virtual environment in much the same way people interact in the real world. The availability of the Internet makes such a virtual world potentially accessible to millions of users. Such a virtual world may impact many areas of everyday life, including communications, entertainment, commerce, and education. However, virtual world information is not easily accessible (when desired) after the virtual world session is complete. In addition, the inconvenience of only communicating with a user during a virtual world session may prove to be highly limiting to the virtual world community.

SUMMARY OF ILLUSTRATIVE EMBODIMENTS

Disclosed are a method, system and computer program product to allow virtual world users to continue, in context, an instant messaging session after exiting the application. Such that one user can invite another user and establish an instant messaging session on a mutually agreeable traditional instant messenger server. When a communication transcript is completed in a virtual instant messaging session, the communication transcript is stored. Wherein the stored communication transcript is an archived virtual world (VW) communication transcript. The archived VW communication transcript is associated with one or more instant messaging clients. A request is received to continue communication, with one or more avatars, when a virtual instant messaging session is completed. When the request is received a graphical user interface (GUI) is automatically displayed. One or more of the following selections are enabled: communicate via the instant messaging session or do not communicate via the instant messaging session. When the selection to communicate, with the one or more avatars, via the instant messaging session is received, the system dynamically initiates an instant messaging session. The GUI is automatically closed when a do not communicate via the instant messaging session selection is received. Access to the archived VW communication transcript is enabled during one or more instant messaging sessions. The content of the archived VW communication transcript is automatically displayed when the archived VW communication transcript is accessed during the instant messaging session.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
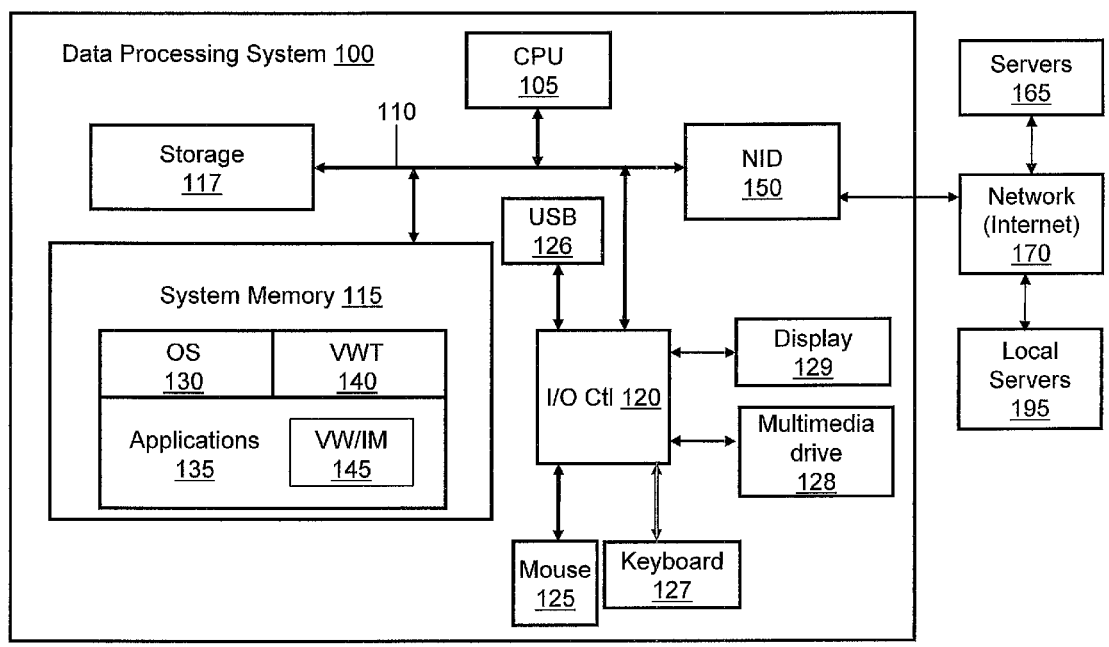
FIG. 1 is a block diagram of a data processing system, within which various features of the invention may advantageously be implemented, according to one embodiment of the invention.

Disclosed are a method, system and computer program product for associating a virtual instant messaging client, of an avatar, with a standard instant messaging account. When a communication transcript is completed in a virtual instant messaging session, the communication transcript is stored. Wherein the stored communication transcript is an archived virtual world (VW) communication transcript. The archived VW communication transcript is associated with one or more instant messaging clients. A request is received to continue communication, with one or more avatars, when a virtual instant messaging session is completed. When the request is received a graphical user interface (GUI) is automatically displayed. One or more of the following selections are enabled: communicate via the instant messaging session or do not communicate via the instant messaging session. When the selection to communicate, with the one or more avatars, via the instant messaging session is received, the system dynamically initiates an instant messaging session. The GUI is automatically closed when a do not communicate via the instant messaging session selection is received. Access to the archived VW communication transcript is enabled during one or more instant messaging sessions. The content of the archived VW communication transcript is automatically displayed when the archived VW communication transcript is accessed during the instant messaging session.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "virtual world" describes a virtual environment wherein communication may be in the form of voice, text, and/or gestures. The virtual world may be intra connected, whereby avatars in multiple virtual world applications are interconnected. The term "archived communication transcript" depicts the written record of the virtual world communication. Archived communication transcript describes the full length document of the virtual world communication between avatars that may be stored by date, time, virtual world, avatar, and/or an instant messaging client alias.

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored.

DPS 100 is also illustrated with a network interface device (NID) 150, with which DPS 100 connects to local server 195 and one or more remote servers 165 via an access network, such as Internet 170. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and The Linux Mark Institute, or AIX®, a registered trademark of IBM), applications 135, including virtual world application (VW) and instant messaging (IM) client (VW/IM) 145, and virtual world transcript (VWT) utility 140. Applications 135 may include a VW application such as Second Life®. In actual implementation, WW/IM client 145, and VWT utility 140 may be combined as a single application collectively providing the various functions of each individual software component when the corresponding code is executed by the CPU 105. For simplicity, VWT utility 140 is illustrated and described as a stand alone or separate software/firmware component, which provides specific functions within the IM client, as described below.

CPU 105 executes VW/IM 145, VWT utility 140, as well as OS 130, which supports the user interface features of VW/IM 145 within VWT utility 140. In the illustrative embodiment, VWT utility 140 provides several graphical user interfaces (GUI) to enable user interaction with, or manipulation of, the functional features of the VW/IM (145) and the utility (140). Among the software code/instructions provided by VWT utility 140, and which are specific to the invention, are: (a) code for associating a virtual instant messaging client, of an avatar, with a standard instant messaging account; (b) code for storing a communication transcript when a virtual instant messaging session is complete, wherein the communication transcript is an archived communication transcript; and (c) code for associating the archived communication transcript with one or more instant messaging clients.

For simplicity of the description, the collective body of code that enables these various features is referred to herein as VWT utility 140. According to the illustrative embodiment, when CPU 105 executes VWT utility 140, DPS 100 initiates a series of functional processes that enable the above functional features as well as additional features/functionality, which are described below within the description of FIGS. 2-8.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
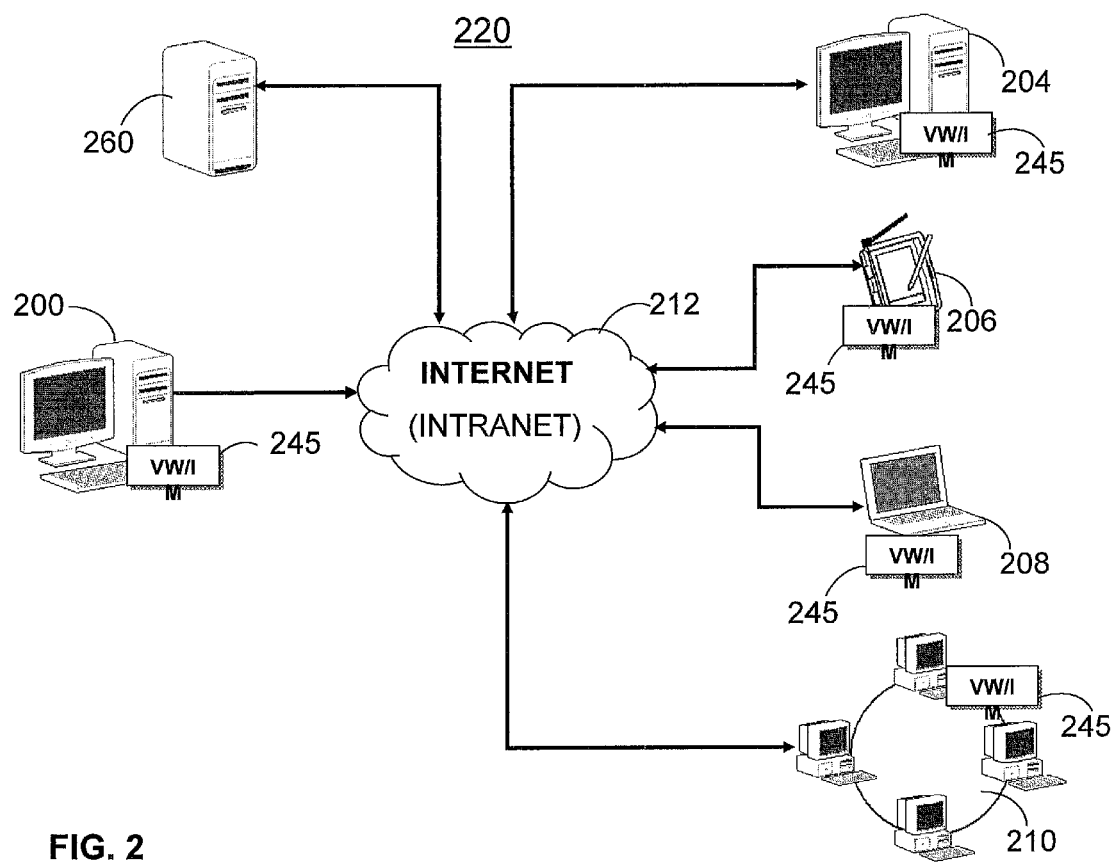
FIG. 2 is a diagram of a network of computers utilizing instant messaging (IM) clients in accordance with one embodiment of the invention.

With reference now to FIG. 2 which illustrates a network of computers that are capable of communicating in real-time via the respective VW/IM 245 (similar to VW/IM 145 of FIG. 1). Several computer systems may exist in network 220, including computer 200, desktop computer 204, handheld computer 206, laptop 208, community computers 210, and host server 260. Host server 260 may be a located within a community of computers within network 220. Host server 260 may be a local or remote machine utilized to store virtual world transcripts. Computer 200 communicates with each computer in network 220 utilizing VW/IM 245 via Internet 212. VW/IM 245 may be utilized to send and receive messages instantly to one or more computers within network 220 via the Internet or an Intranet.

Community computers 210 are a community of networked computers utilized in a corporate setting for collaboration purposes. Community computers 210 communicate with computer 200. The corporate setting may be for educational, business, or leisure purposes. In one embodiment, a virtual world communication session has ended between avatars on community computers 210 and computer 200. A communication transcript of the virtual world communication is stored, or archived. The archived communication transcript is associated with one or more IM clients (such as IM client of VW/IM 145 of FIG. 1).

In one embodiment, computer 200 communicates with desktop computer 204, handheld computer 206, laptop computer 208, and community computers 210, utilizing the IM client of VW/IM 245. An author of a virtual world communication transcript may select the archived communication transcript during an IM communication. The selected archived communication transcript may be indexed according to the date, time, subject (or title), and/or author of the virtual world communication. The archived transcript may be archived, or stored, on host server 260.

Figure 3:
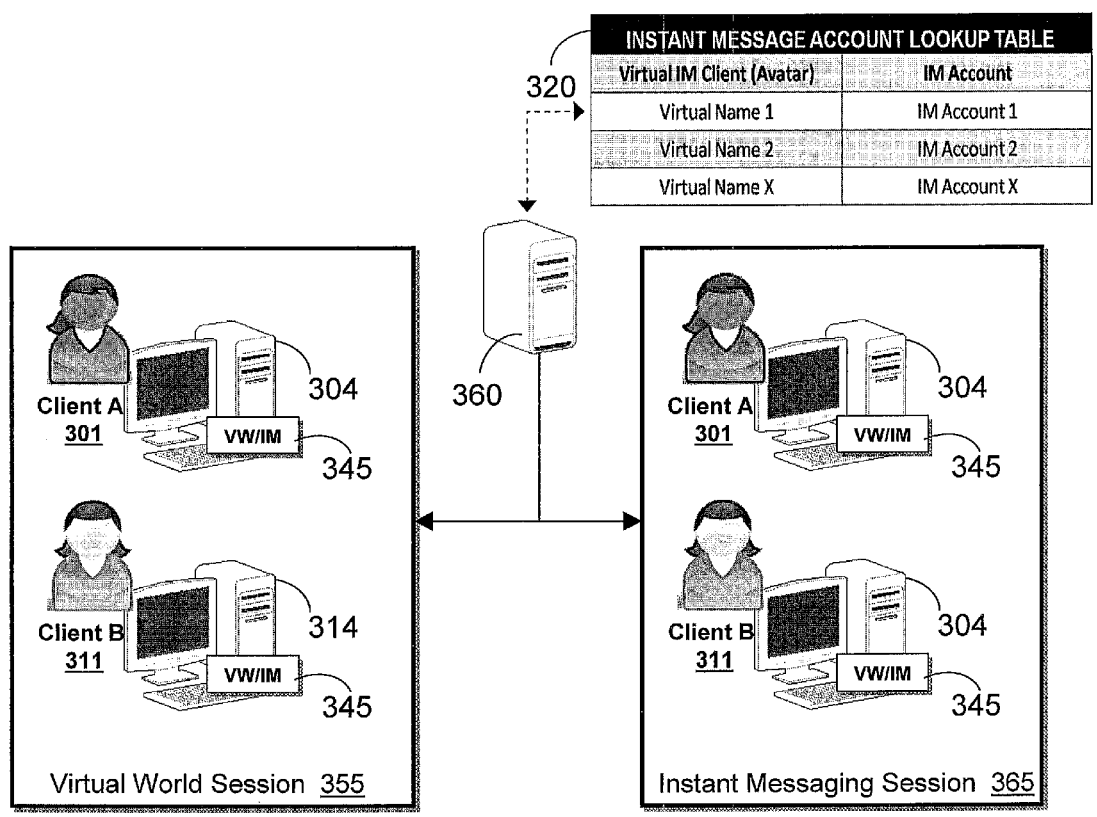
FIG. 3 is a block diagram illustrating a virtual world session associated with an instant messaging session according to one embodiment of the invention.

FIG. 3 illustrates a virtual world session associated with an instant messaging session. The block diagram of FIG. 3 comprises virtual world session 355, instant messaging session 365, host server 360 (similar to host server 260 of FIG. 2), and instant message account lookup table 320. Client A 301 and client B 311 communicate on computer A 304 and computer B 314, respectively. Computer A 304 and computer B 314 are similar to DPS 100. Client A 301 and client B 311 may utilize VW/IM 345 (similar to VW/IM 145 of FIG. 1) on computer A 304 and computer B 314.

In one embodiment a virtual instant messaging client, of an avatar, is associated with a standard instant messaging account. When client A 301 and client B 311 complete communication in virtual world session 355, communication may be continued in instant messaging session 365. Host server 360 provides instant message account lookup table 320. Instant message account lookup table 320 identifies the standard instant messaging account of an avatar. Instant message account lookup table provides a preferred instant messaging client in which to continue communication with an avatar, an electronic mail (e-mail) account to be utilized for instant message and/or e-mail communication, as well as login credentials required to join the preferred instant message client.

In one embodiment when a virtual instant messaging session is complete, the communication transcript is stored (or archived), wherein the communication transcript is an archived communication transcript. During virtual world session 355, communication between client A 301 and client B 311 is transcribed and stored. The communication may be stored as an archive on host server 360. When a request is accepted to continue communication in instant messaging session 365, the archived virtual world communication may be retrieved via VWT utility 140 (FIG. 1). The virtual world communication may be stored according to one or more instant messaging identification, avatar names, the date/time of the communication, and/or subject/title of the communication.

In one embodiment a request is received to continue communication, with one or more avatars, when the virtual instant messaging session is complete. When client A 301 consents to a request of client B 311 to continue communication via a standard instant messaging client, instant message account lookup table 320 dynamically searches for account information. Client A 301 receives one or more of: a preferred instant messaging client in which to continue communication with an avatar, an electronic mail (e-mail) account to be utilized for instant message and/or e-mail communication, and login credentials required to join the preferred instant message client.

In one embodiment when a request is received to continue communication when a virtual world session is ended, VWT utility 140 (FIG. 1) automatically initiates the preferred instant messaging client. VW/IM 345 may be configured to instantaneously begin instant messaging session 365 when virtual world session 355 has ended. Client A 301 may send a request to client B 311 to continue communication via instant messaging session 365. When client B 311 consents to continue communication on an instant messaging client, instant messaging session 365 is initiated by VWT utility 140.

Figure 4:
FIG. 4 illustrates a graphical user interface for inviting one or more avatars to an instant messaging session in accordance with one embodiment of the invention.

FIG. 4 comprises instant message request graphical user interface (GUI) 400. Instant message request GUI 400 includes invite message 403, join selection 406, and do not join selection 416.

In one embodiment automatically displaying a graphical user interface (GUI), wherein the GUI displays a request to join an instant messaging session. Instant message request GUI 400 displays invite message 403. Invite message 403 includes the instant messaging contact and/or avatar of the requesting party. Invite message 403 may also display the preferred instant messaging server/client of which to conduct the instant messaging session.

In one embodiment enabling selection of one of: communicate via the instant messaging session or do not communicate via the instant messaging session. Join selection 406 may be selected when the recipient, receiving instant message request GUI 400, agrees to communicate via the instant messaging session. When join selection 406 is enabled, VWT utility 140 dynamically initiates the instant messaging session. When the recipient, receiving instant message request GUI 400, does not agree to communicate via the instant messaging session, do not join selection 416 may be enabled. Instant message request GUI 400 is automatically closed when do not join selection 416 is received. Wherein do not communicate via the instant messaging session is permitted by enabling do not join selection 416. A message may be sent to the requesting avatar that the requested avatar has denied continued communication on the instant messaging client.

Figure 5:
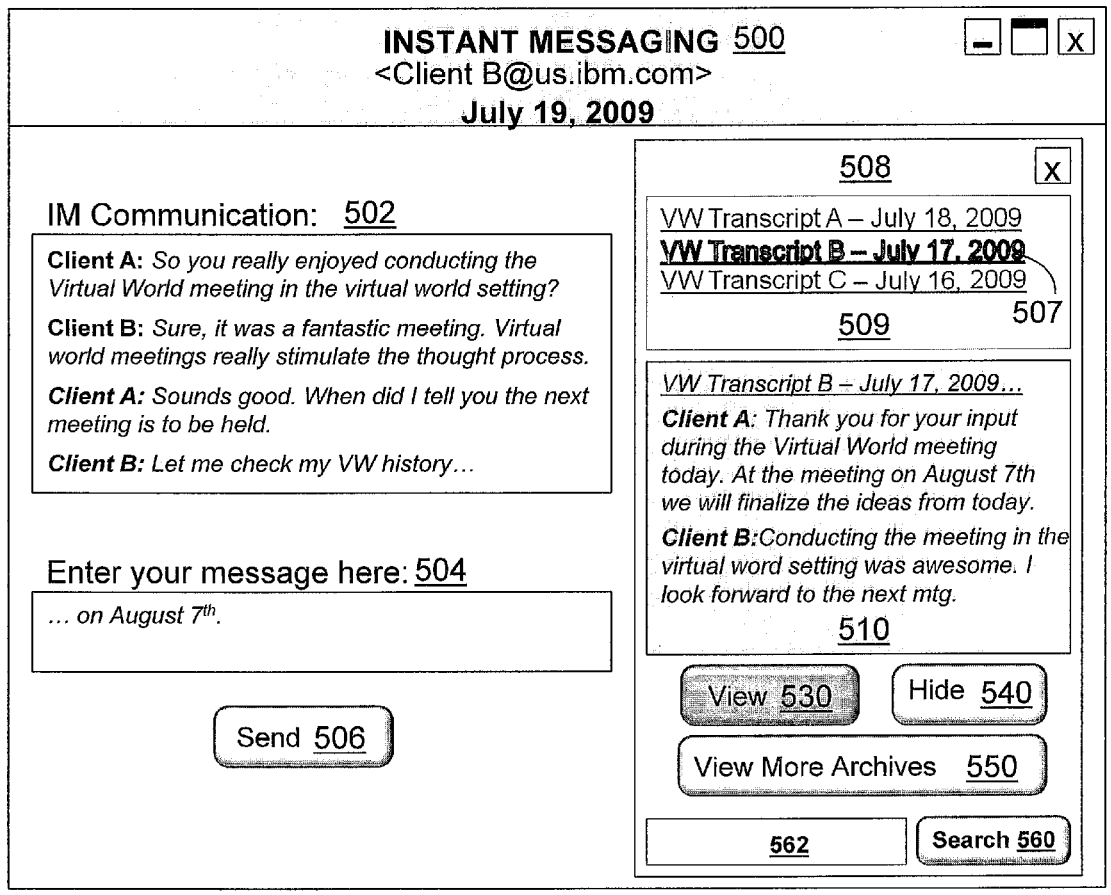
FIG. 5 illustrates a graphical user interface for viewing an archived communication transcript according to one embodiment of the invention.

FIG. 5 illustrates instant messaging (IM) GUI 500. IM GUI 500 comprises IM communication 502, IM message entry 504, and IM send selection 506. Review window 510, view selection 530, hide selection 540, and view more archives selection 550 within toolbox 508 are utilized to view archived transcripts listed in transcript selection box 509. Archived IM transcript 507 is displayed within transcript selection box 509. Search selection 560 may enable a search for one or more words, phrases, names, numbers (date, time, etc.) associated with archived IM transcript 507, when the search term is entered into entry box 562.

In one embodiment the archived communication transcript is associated with one or more instant messaging clients. The content of archived IM transcript 507 is displayed. Archived IM transcript 507, in transcript selection box 509, is selected. When view selection 530 is engaged, the content of archived IM transcript 507 is displayed. IMT utility 140 (FIG. 1) may automatically display archived IM transcript 507 when archived IM transcript 507 is selected. Review window 510 displays the content of the archived IM transcript 507. The content of archived IM transcript 507 maybe hidden or closed by selecting hide selection 540, wherein hide selection 540 hides the information within review window 510.

In one embodiment, the archived IM transcript is displayed as originally created. When review window 510 displays archived IM transcript 507, IMT utility 140 displays archive IM transcript 507 as created. Archived IM transcript 507 is displayed with original characteristics associated with the transcript such as: color, line, font, italics, and bold font.

In one embodiment automatically displaying the content of the archived communication transcript when the archived communication transcript is selected during the instant messaging session. The characteristic associated with the transcript may be IM identification (ID), date, time, author, title, and/or subject of an archived IM transcript. The date and time are displayed with the subject and/or title of archived IM transcript 507. When the IM transcript of interest is not listed, the IM transcript may be searched for by entering the search term in entry box 562. The search term may be a title, date, time, author, word, and/or subject associated with the IM transcript of interest. Engaging search 560 initiates a search for the archived IM transcript. The one or more IM transcripts ascertained during the search are displayed in transcript selection box 509.

Figure 6:
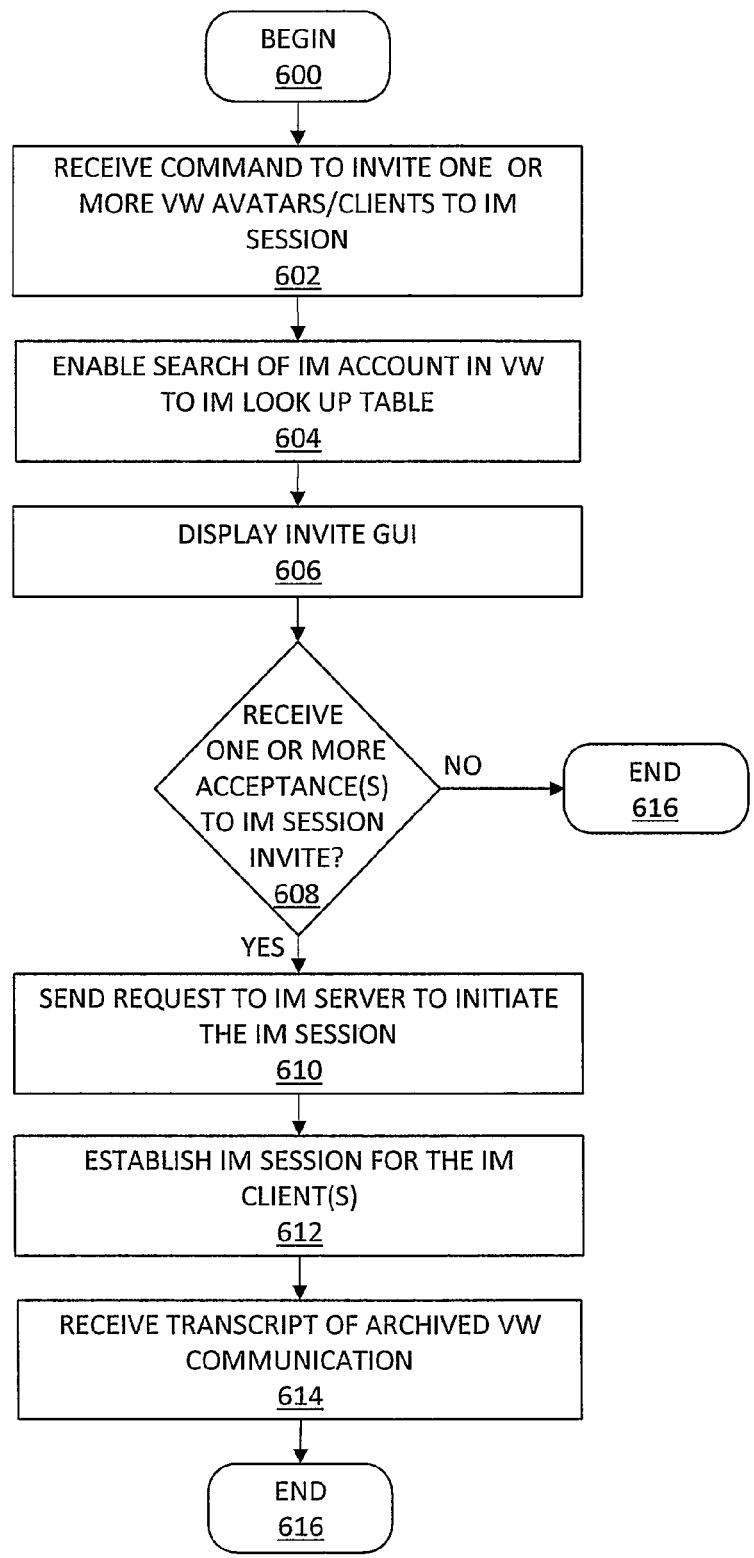
FIG. 6 is a logic flow chart for associating a virtual world communication with a instant messaging communication according to one embodiment of the invention.
Figure 7:
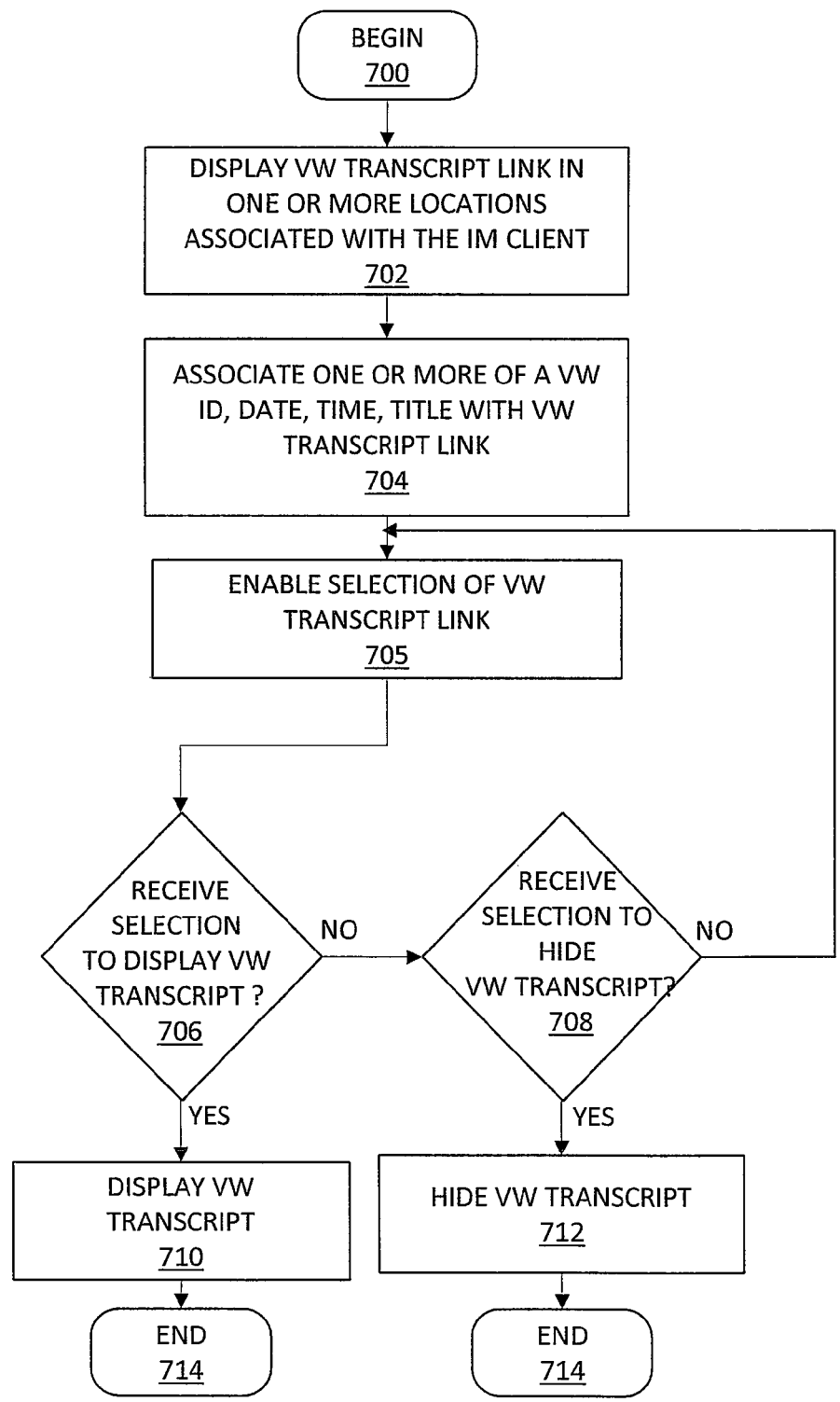
FIG. 7 is a logic flow chart for displaying an archived virtual world transcript in accordance with one embodiment of the invention.
Figure 8:
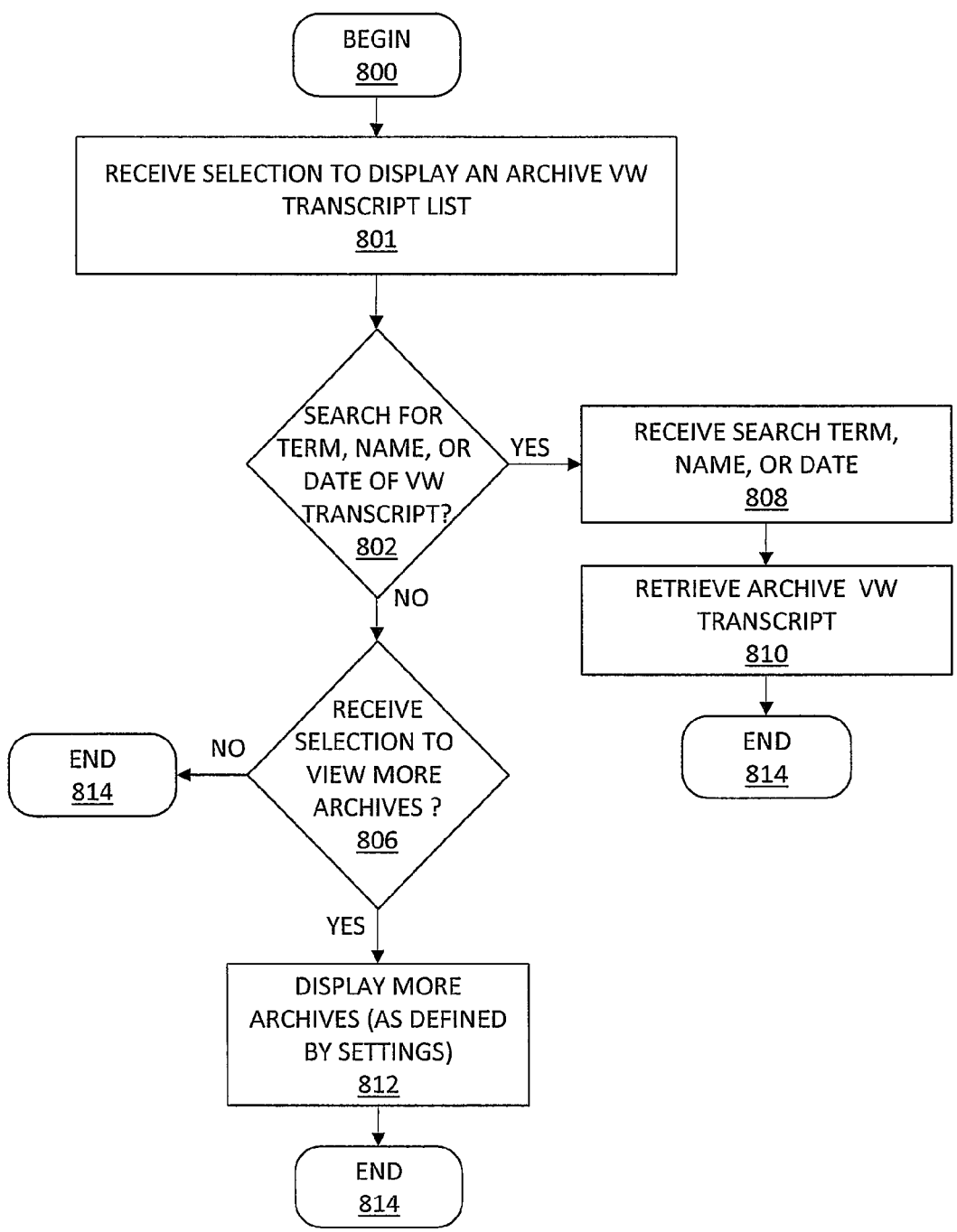
FIG. 8 is a logic flow chart for managing archived virtual world transcripts according to one embodiment of the invention.

FIGS. 6-8 are flow charts illustrating various methods by which the above processes of the illustrative embodiments are completed. Although the methods illustrated in FIGS. 6-8 may be described with reference to components shown in FIGS. 1-5, it should be understood that this is merely for convenience and alternative components and/or configurations thereof can be employed when implementing the various methods. Key portions of the methods may be completed by VWT utility 140 executing within DPS 100 (FIG. 1) and controlling specific operations on DPS 100, and the methods are thus described from the perspective of both VWT utility 140 and DPS 100.

FIG. 6 describes the process for displaying an archived IM transcript when the request to continue communication, via an IM client, has been received by VWT utility 140. The process of FIG. 6 begins at initiator block 600 and proceeds to block 602, at which a command to invite one or more virtual world avatars/clients to an IM session is received. At block 604 a search of an IM account within instant messaging lookup table (320 of FIG. 3) is enabled. Instant message request GUI is displayed at block 606. A decision is made, at block 608, whether one or more acceptances to the IM communication request are received. When the acceptance is not received, the process ends at block 616. When one or more acceptances are received, the process continues to block 610. At block 610 a request is sent to the IM server to initiate the IM session. The IM session is established at block 612. At block 614 the archived transcript of the virtual world communication is received by the IM client.

FIG. 7 describes the process for displaying archived virtual world (VW) communication transcripts. The process of FIG. 7 begins at initiator block 700 and proceeds to block 702, at which the link to the archived VW transcript is displayed in one or more locations associated with the IM client. At block 704 one or more characters are associated with the archived VW communication transcript, wherein the one or more characteristics are the IM identification (ID), date, time, title, author, and/or subject of the archived VW communication transcript. The archived VW communication transcript link is enabled at block 705. A decision is made at block 706 whether a selection is received to display the archived VW communication transcript. If a decision is not received to display the archived VW communication transcript, the process continues to block 708. If a decision is made to display the archived VW communication transcript, the process continues to block 710. At block 710 the archived VW communication transcript is displayed. At block 708 a decision is made whether a selection was received to hide an archived VW communication transcript/link. If the decision is made not to hide an archived VW communication transcript/link, the process continues to block 705. If the decision is made to hide the archived VW communication transcript/link, the process continues to block 712. At block 712 the archived VW communication transcript is closed. The process ends at block 714.

The process for managing archived VW communication transcripts is described in FIG. 8. The process of FIG. 8 begins at initiator block 800 and proceeds to block 801, at which a selection is received to display the archived VW communication transcript list in transcript selection box 309 (FIG. 3). A decision is made at block 802 whether a selection is received to search for a term, name (IM ID), or date associated with the archived VW communication transcript. If a selection is received to search for a term, name (IM ID), or date associated with the archived VW communication transcript the process continues to block 808. If a selection is not received to search for a term, name (IM ID), or date associated within an archived VW communication transcript the process continues to block 806. At block 808 the search term, name, or date is received. The archived VW communication transcript associated with the search term, name, or date is retrieved. The process ends at block 814.

At block 806 a decision is made whether a selection is received to view more archives. If the selection is not received to view more archives, the process ends at block 814. If the selection is received to view more archives, the process continues to block 812. Additional archives are displayed at block 812, as defined by the IM client settings. IM client settings may limit the number of archived VW communication transcripts to be displayed, or prevent a transcript containing a particular word or name from being displayed. The process ends at block 814.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
    associating, using a processor, a virtual instant messaging client, of an avatar in a virtual world (VW) environment, with a standard instant messaging account outside of said VW environment;
    when a virtual instant messaging session within said VW environment is complete, storing a communication transcript in a memory, wherein the communication transcript is an archived VW communication transcript;
    associating, using the archived VW communication transcript with one or more instant messaging clients;
    receiving a request to continue communication within a standard instant messaging account outside of said VW environment, with one or more avatars, when the virtual instant messaging session is complete; and
    dynamically initiating a standard instant messaging session outside of said VW environment when the request to continue communication is received.

2. The method of claim 1, wherein receiving a request to continue communication further comprises:
    automatically displaying a graphical user interface (GUI), wherein the GUI displays a request to said one or more avatars to join said standard instant messaging session;
    enabling selection of communicate via the standard instant messaging session and do not communicate via the standard instant messaging session;
    when a selection is received to communicate via the standard instant messaging session, automatically displaying options for selection of instant messaging client, electronic mail (e-mail) account, username, and login information; and
    automatically closing the GUI when a do not communicate via the standard instant messaging session selection is received.

3. The method of claim 1, wherein associating, using said processor, the archived VW communication transcript with one or more instant messaging clients further comprises:
    enabling access to the archived VW communication transcript during one or more standard instant messaging sessions outside of said VW environment;
    enabling selection of the archived VW communication transcript from the standard instant messaging client; and
    automatically displaying the content of the archived VW communication transcript when the archived VW communication transcript is selected during the standard instant messaging session outside of said VW environment.

* * * * *